ТНЕ

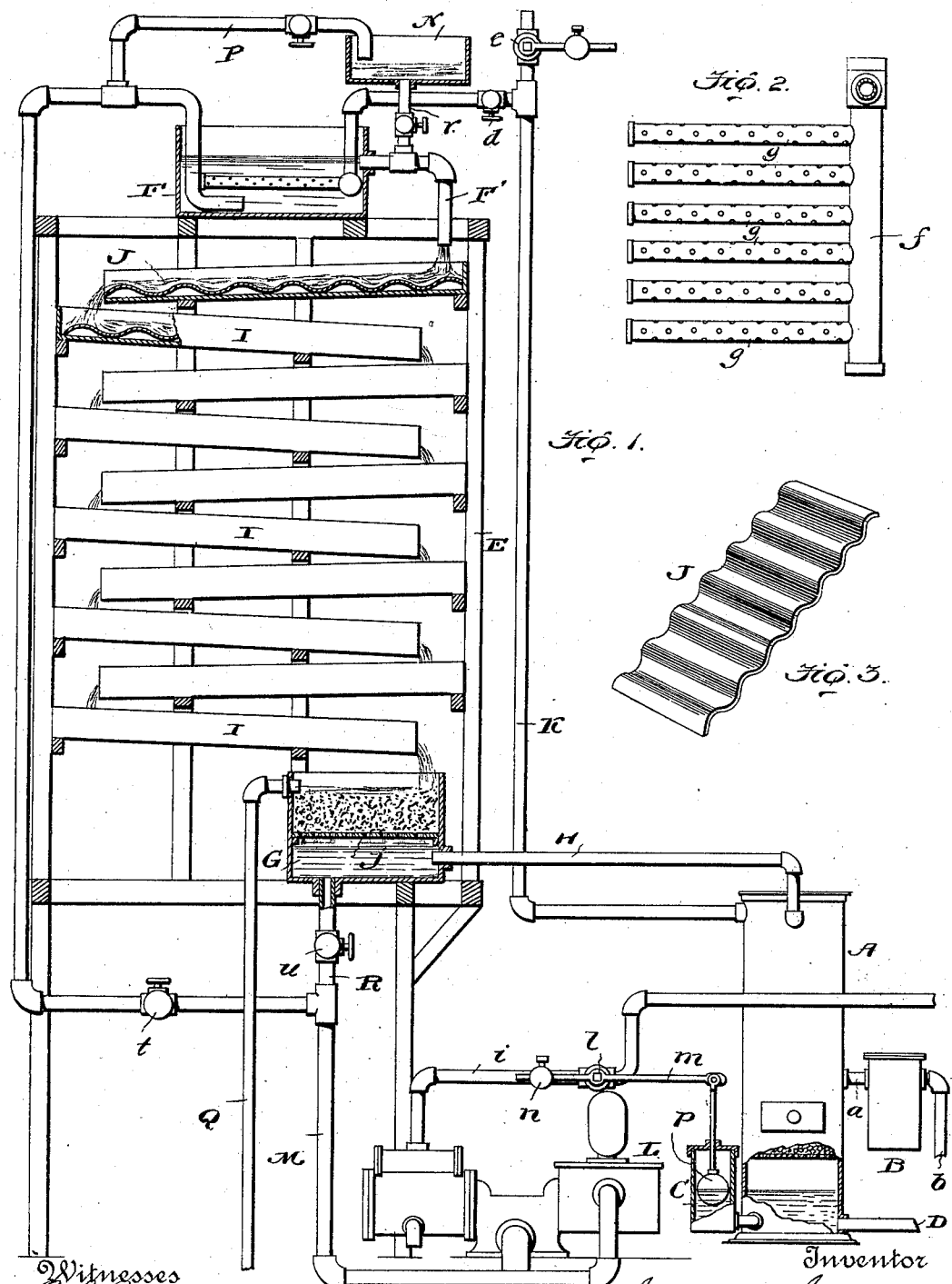

UNITED STATES PATENT OFFICE.

CHARLES H. SNYDER, OF LANSING, MICHIGAN.

WATER-PURIFIER.

SPECIFICATION forming part of Letters Patent No. 691,880, dated January 28, 1902.

Application filed June 25, 1901. Serial No. 66,003. (No model.)

*To all whom it may concern:*

Be it known that I, CHARLES H. SNYDER, a citizen of the United States, residing at Lansing, in the county of Ingham and State of Michigan, (whose post-office address is Lansing, Michigan,) have invented new and useful Improvements in Water-Purifiers, of which the following is a specification.

My invention relates to improvements in that class of water purifiers and filters which are designed to utilize the exhaust-steam of engines; and it consists in a water purifying and filtering apparatus of the type stated which is peculiar and highly advantageous in that it is adapted to condense all of the steam received and utilize the same to heat water from a source of supply and also in that it is adapted to purify and filter the water of condensation and the water from the source of supply while the same are in a highly-heated state and much more amenable to purification than when cold, with the result that the water discharged from the apparatus to be fed to the boiler of the engine or used in other connections is approximately ninety per cent. pure.

With the foregoing in mind the invention will be fully understood from the following description and claims when taken in conjunction with the annexed drawings, in which—

Figure 1 is a view of my improved apparatus with some of the parts in elevation and others in vertical section. Fig. 2 is an enlarged detail horizontal section illustrating the header and plurality of perforated pipes connected therewith for discharging steam into the condensing-tank of the apparatus, and Fig. 3 is a perspective view of one of the corrugated plates employed in the apparatus and hereinafter referred to.

Referring by letter to the said drawings, A is a water purifier and filter which may be and preferably is of the construction disclosed in my Letters Patent No. 532,829, of January 22, 1895.

B is a device for extracting oil from exhaust-steam precedent to the passage of the latter to the purifier and filter A, said device B being connected by a pipe $a$ with the steam-chamber of the device A and designed to be connected by a pipe $b$ with the exhaust of a steam-engine.

C is a float-chamber connected by a pipe $c$ with the pure-water chamber of the device A, and D is a pipe which is also connected to said pure-water chamber and is adapted to convey the purified and filtered water to the boiler of the engine or any other desired point.

E is a support, preferably in the form of an open frame of wood or angle-iron, which is disposed in a plane above the device A. F is a condensing-tank mounted on said support.

G is a tank disposed in the lower portion of the support and connected by a pipe H with the upper portion of the device A, and I I are trays arranged one above the other in the support and interposed between the tanks F and G. These trays, which have for their purpose to convey heated water from the tank F to the tank G, are alternately inclined in opposite directions, and with the exception of the lowermost tray, which is arranged to discharge into the tank G, they are each adapted to discharge into the upper portion of the next lower tray, after the manner shown in Fig. 1. In the several trays are arranged corrugated plates J, which extend throughout the length thereof and are calculated incident to the downward passage of the heated water to remove a large percentage of lime and other sediment therefrom. It will also be observed that incident to the downward passage of the heated water in the open trays it will give off the gases contained therein and will be thoroughly aerated, as is desirable.

K is a pipe which leads from the upper portion of the purifier and filter A to the condensing-tank and is designed to conduct steam to the latter. This pipe is provided with a cock $d$ and a suitable back-pressure valve $e$, and in the preferred embodiment of the invention it terminates in the tank F in a header $f$, provided with a plurality of perforated pipes $g$, this to discharge the steam in small jets into the water.

L is a pump designed to be connected through the medium of a pipe $h$ with a suitable source of water-supply and through the medium of a pipe $i$ with the boiler of the engine from which the exhaust-steam is taken or any other suitable source of steam-supply, and M is a pipe which leads from the discharge of the pump to the tank F and supplies the latter with the water for effecting the condensation of the steam received from the purifier and filter A.

In the practical operation of my improved apparatus the steam supplied from the exhaust of the engine to the purifier and filter A passes through the said purifier and filter, and from thence, by way of the pipe K, header f, and perforated pipes g, into the water contained in the tank F, which tank is continuously supplied with water from a suitable source of supply by the pump L through the pipe M, as before described. The steam is entirely condensed by the water in tank F, and incident to the condensation heats such water, so that the water discharged through the pipe F' on the uppermost tray I is highly heated and remains in such condition during its passage through the series of trays I, the tank G, and the pipe H, with the result that it is put into the purifier and filter A at a temperature of about 180° Fahrenheit. The water passes downwardly in the purifier and filter A to the pure-water chamber thereof after the manner pointed out in my aforesaid Letters Patent and during such passage condenses a portion of the steam entering the purifier and filter and is further heated thereby, so that when it is put in the boiler of the engine or to any other use it is in a highly-heated condition, as is desirable.

The corrugated plates J in the trays I serve to catch and hold the major portion of the lime and other sediment in suspension in the heated water and the remainder is deposited in the tank G, with the result that after the water passes through the purifier and filter A it is approximately ninety per cent. pure.

The tank G might be simply a settling-tank without departing from the scope of my invention; but I prefer to provide it with a foraminated diaphragm j and filtering material, such as quartz and sand, thereon, since it is then better enabled to remove the impurities that are left in the water after the passage of the same over the several trays I. In the preferred embodiment of the invention the pipe i, which supplies steam to the pump L, is provided with a valve l, and the stem of this valve is connected to a lever m, weighted at one end, as indicated by n, and connected at its opposite end to a float p, movable in the chamber C. From this it follows that the supply of steam to the pump will be controlled by the quantity of water in the clearwater chamber of the filter and purifier A, and consequently the action of the pump and the supply of water to the condensing-tank F will be increased and diminished as the water falls and rises in the said clear-water chamber and the chamber C.

In order to adapt the apparatus for the treatment of very muddy water, I provide a coagulant-tank—that is to say, a tank adapted to receive alum or any other suitable coagulant. This tank, which is lettered N, is connected by a valved pipe r with the discharge-pipe F' of the condensing-tank F and is designed to be supplied with water by the pipe M through a branch pipe P, which is also provided with a valve. Thus it will be seen that when the condition of the water is such as to necessitate the use of a coagulant the attendant of the apparatus has but to place a suitable quantity of coagulant in the tank N and open the valves of the pipes r and P, when a portion of the water pumped through the pipe M will pass from thence, through the pipe P, tank N, and pipe r, into the pipe F', and then together with the heated water from the tank F will pass over the corrugated plates J in the several trays I of the series. The major portion of the mud in the water will be precipitated in the depressions of the corrugated plates J, and the remainder thereof will be caught in the tank G or the filtering material thereof.

The corrugated plates J are readily removable from the trays I, and hence it will be observed that said plates and trays may be conveniently cleared of collected sediment when necessity demands.

To expedite removal of the sediment from the tank G and the filtering material therein, I provide the said tank with a discharge-pipe Q, which leads from its upper portion, and carry a branch pipe R from the pipe M to the bottom of the tank G. The pipe M is provided with a cock t and the pipe R with a cock u, and when the former valve is closed and the latter opened water will obviously be forced from the pump L through the tank G and will pass from thence through the pipe Q and take with it the sediment contained in the tank.

The back-pressure valve e, hereinbefore referred to, has for its purpose to permit the escape of steam from the pipe K to the atmosphere when back pressure due to the discharge of the steam into the water in tank F threatens to interfere with the action of the engine supplying the exhaust-steam.

It will be appreciated from the foregoing that while simple and inexpensive in construction my improved apparatus is adapted to utilize all of the steam received from the exhaust of an engine, which is desirable on the score of economy and also because it prevents the condensation of the steam in the atmosphere and the precipitation of the same in the form of spray from the tops of buildings; also, that the apparatus is adapted to purify and filter water while the same is in a heated condition, which facilitates the operation, and in addition to clarifying and purifying muddy water is calculated to purify and soften hard water.

I have entered into a detailed description of the construction and relative arrangement of the parts embraced in the present and preferred embodiment of my invention in order to impart a full, clear, and exact understanding of the same. I do not desire, however, to be understood as confining myself to such specific construction and relative arrangement of parts, as such changes or modifications may be made in practice as fairly fall within the scope of my claims.

Having described my invention, what I claim, and desire to secure by Letters Patent, is—

1. A water purifying and filtering apparatus comprising the purifying and filtering device adapted to be connected with a source of steam-supply, a condensing-tank connected with the purifying and filtering device so as to receive steam therefrom, a vertical series of trays disposed below the condensing-tank and arranged so that each will receive from the tray above it, a pipe for conveying water from the condensing-tank to the uppermost tray, a tank arranged to receive water from the lowermost tray, and connected with the purifying and filtering device, a pump adapted to be connected with a source of steam-supply and also with a source of water-supply and having its discharge connected with the condensing-tank, a coagulant-tank disposed above the condensing-tank, a valved pipe connected with the discharge of the pump and leading to the coagulant-tank, and a valved pipe connecting the coagulant-tank and the pipe intermediate of the condensing-tank and the uppermost tray.

2. A water purifying and filtering apparatus comprising the purifying and filtering device adapted to be connected with a source of steam-supply, a plurality of trays arranged one above the other and alternately inclined in opposite directions so that each will discharge into the next lower trays, removable corrugated plates normally arranged in the trays, a tank disposed below the lowermost tray and connected with the purifying and filtering device, and having a discharge-pipe, a condensing-tank disposed above the uppermost tray and arranged to discharge therein, a conduit intermediate of the purifying and filtering device and the condensing-tank for conveying steam from the former to the latter, a pump adapted to be connected with a source of steam-supply and also with a source of water-supply, a pipe leading from the discharge of the pump to the condensing-tank, and a branch pipe connecting said pipe and the lower tank and provided with a valve.

3. A water purifying and filtering apparatus comprising the purifying and filtering device having a port for connection with a source of steam-supply, and a pure-water chamber provided with a discharge, an oil-extractor intermediate of the filtering and purifying device and the source of steam-supply, a condensing-tank connected with the purifying and filtering device so as to receive steam therefrom, a vertical series of trays intermediate of the condensing-tank and said purifying and filtering device for conveying water and enabling the same to give off its gases and become aerated, means in the trays for removing sediment from the water, a pump adapted to be connected with a source of water-supply and having its discharge connected with the condensing-tank, a pipe provided with a valve and adapted to supply the pump with steam, a chamber C connected with the pure-water chamber of the purifying and filtering device, and a float arranged in said chamber C and connected with the valve in the steam-supply pipe of the pump.

In testimony whereof I have hereunto set my hand in presence of two subscribing witnesses.

CHARLES H. SNYDER.

Witnesses:
J. EDWARD ROE,
A. V. CUELEBROECK.